UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS.

ARTICLE OF ALUMINA AND METHOD OF MAKING SAME.

1,037,999.  Specification of Letters Patent.  Patented Sept. 10, 1912.

No Drawing.  Application filed December 26, 1908. Serial No. 469,308.

*To all whom it may concern:*

Be it known that I, LEWIS E. SAUNDERS, a citizen of the United States, residing at Niagara Falls, in the county of Niagara and State of New York, have invented certain new and useful Improvements in Articles of Alumina and Methods of Making Same, of which the following is a specification.

This invention relates to the manufacture of highly refractory articles such as crucibles, tubes, bricks, or the like consisting essentially of previously molten alumina in the form of grains or discrete particles, bonded by an aluminous deposit.

It is well known that articles consisting of particles of alumina bonded by fireclay or like ceramic bond are less refractory under high temperature conditions than the alumina itself, not only by reason of the lower melting point of the bonding agent but because of the fluxing action of the bond upon the alumina.

According to my invention the aluminous particles are bonded by an aluminous bonding agent, preferably derived from the particles themselves by partial or superficial solution of these particles in a flux or temporary bond which is subsequently expelled by heat.

That the invention may be clearly understood it will be described by reference to certain specific embodiments, although it will be understood that the principle may be variously applied. For example I may proceed substantially as follows: Alumina which has solidified from a state of fusion is crushed and graded, and is then mixed with a small proportion say four to eight per cent. of a bonding agent which in the molten state possesses a solvent action on alumina, and which is volatile at high temperatures, or, if incompletely volatilized, leaves a residue consisting essentially of alumina. As suitable bonding agents I may mention boracic acid, aluminum fluorid or the double fluorid of aluminum and sodium, sodium or potassium carbonates, caustic soda, etc. The materials are preferably mixed and molded in a moist state and are then carefully dried. The articles are then placed in a suitable furnace or kiln and subjected to a very high temperature, whereupon the following actions occur. The bonding agent fuses and dissolves alumina from the surfaces of the particles; then as the temperature increases the bonding agent is volatilized, with or without decomposition, and is expelled, leaving an interstitial deposit of previously dissolved alumina. Preferably the temperature is ultimately raised to a point at which the particles or grains of alumina begin to soften, whereby they are firmly fritted or bonded together. An electric furnace or kiln is preferred for the baking or for the final stages thereof but may not be required in all cases.

In forming the articles the temperature is carried gradually beyond the point at which the temporary binders are expelled, and to the point at which the aluminous particles or the interstitial alumina, deposited from the flux, begins to soften, under which conditions the softened alumina is capable of exerting a bonding effect upon the solid particles. The time of heating necessary to accomplish this result will of course depend largely upon the size and shape of the articles.

Obviously the bonding agents employed may contain alumina, or may consist of solutions of alumina in the fluxes named above, in which case the interstitial deposit is derived in part only from the particles to be bonded, or it may even be derived entirely from the bond.

The aluminous particles to be bonded may consist of pure alumina or they may contain such impurities as are commonly present in commercial aluminous products. The process presents special advantages however as applied to alumina of substantial purity, as the material is then free from the fluxing action of oxidized impurities as well as from the fluxing action of an ordinary ceramic bond, and is extremely refractory under heat.

I claim:

1. The method of making molded articles consisting essentially of alumina, which consists in bonding aluminous particles by a flux having a solvent effect upon alumina, and thereafter heating the article to a temperature approximating the melting or softening point of pure alumina, whereby the flux is expelled and the particles are bonded by the softened alumina.

2. A molded article consisting essentially of grains or particles of alumina having an interstitial bond of previously dissolved alumina, the mass fritted together at a temperature approximating the melting or softening point of pure alumina.

In testimony whereof, I affix my signature in presence of two witnesses.

LEWIS E. SAUNDERS.

Witnesses:
C. P. TOWNSEND.
R. P. CAPRON.